(12) United States Patent
Lawrence

(10) Patent No.: US 8,814,259 B2
(45) Date of Patent: Aug. 26, 2014

(54) FRAME FOR OPEN ROOF CONSTRUCTION

(75) Inventor: Timothy Scott Lawrence, Lake Orion, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/400,249

(22) Filed: Feb. 20, 2012

(65) Prior Publication Data

US 2013/0214563 A1 Aug. 22, 2013

(51) Int. Cl.
*B60J 7/057* (2006.01)
(52) U.S. Cl.
USPC .................................. 296/216.08
(58) Field of Classification Search
USPC .......................... 296/216.01–224
See application file for complete search history.

(56) References Cited

U.S. PATENT DOCUMENTS

| | | | |
|---|---|---|---|
| 4,749,227 A * | 6/1988 | Bienert et al. | 296/221 |
| 4,969,681 A * | 11/1990 | Schleicher et al. | 296/223 |
| 6,363,900 B1 | 4/2002 | Homi | |
| 6,431,644 B1 | 8/2002 | Nagashima | |
| 6,582,014 B1 | 6/2003 | Racine | |
| 6,663,172 B2 | 12/2003 | Weiss | |
| 6,830,291 B2 | 12/2004 | Langguth | |
| 6,832,811 B2 | 12/2004 | Nabuurs | |
| 7,354,103 B2 | 4/2008 | Esteban | |
| 7,806,469 B2 * | 10/2010 | Godet | 296/216.03 |

FOREIGN PATENT DOCUMENTS

| | | |
|---|---|---|
| DE | 4422646 | 8/1995 |
| JP | 55113541 A2 | 9/1980 |
| JP | 61226060 A2 | 10/1986 |

OTHER PUBLICATIONS

Polyplastics, DSI (Die slide injection molding), copyright 2001-2012.
Plas-Tech Engineering, Inc., "Molding—Die Slide Injection", copyright 2012.
Plasticker-News, Engel: New process supports hot gas welding directly in the mould, Jan. 2011.
Kunststoff Information, 2011.
Furuya Industrial Co., Ltd., "Technical Information DSI Molding" copyright 1998-2011.
The Japan Steel Works, Ltd., DSI history, created Nov. 2005.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A frame for an open roof construction is provided, said frame comprising at least one channel member for guiding a drive member, such as a drive cable. Said channel member, as seen in cross section, comprises a base part which is defined by a corresponding local depression of the frame and a cover part connected to said base part. The connection between said base part and said cover part is continuous over the length of said channel member. It is possible that the cover part is connected to the base part through die slide injection molding.

29 Claims, 4 Drawing Sheets

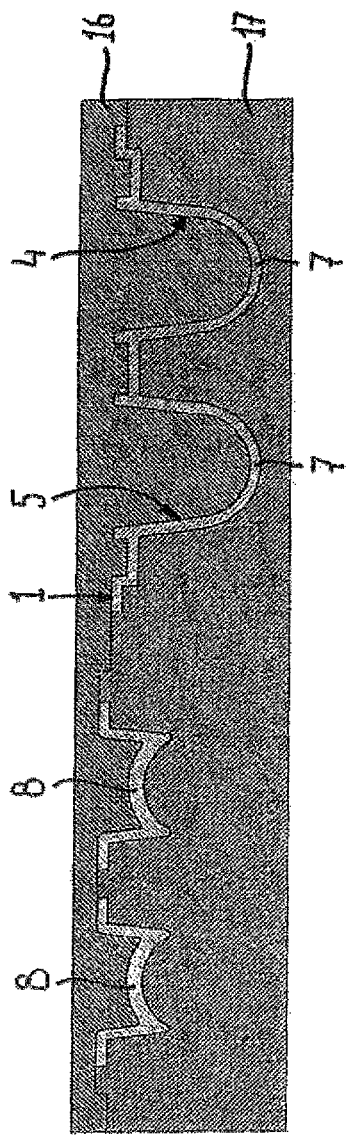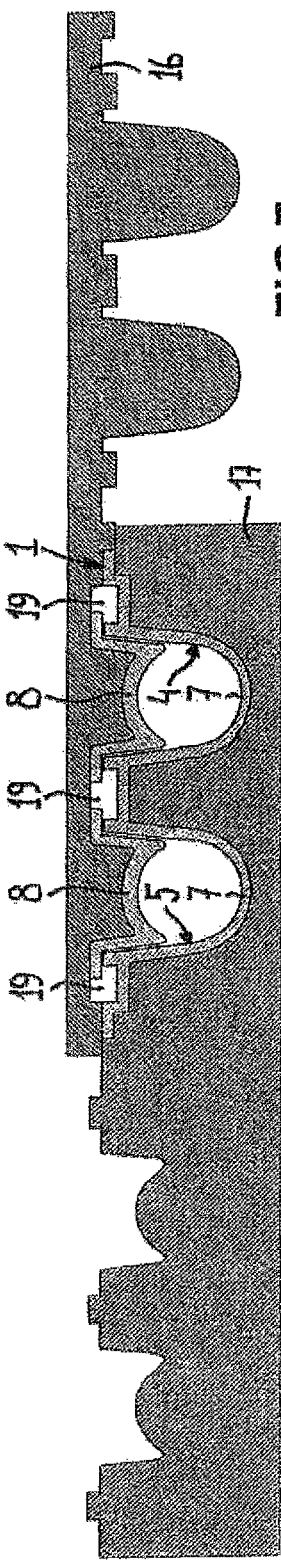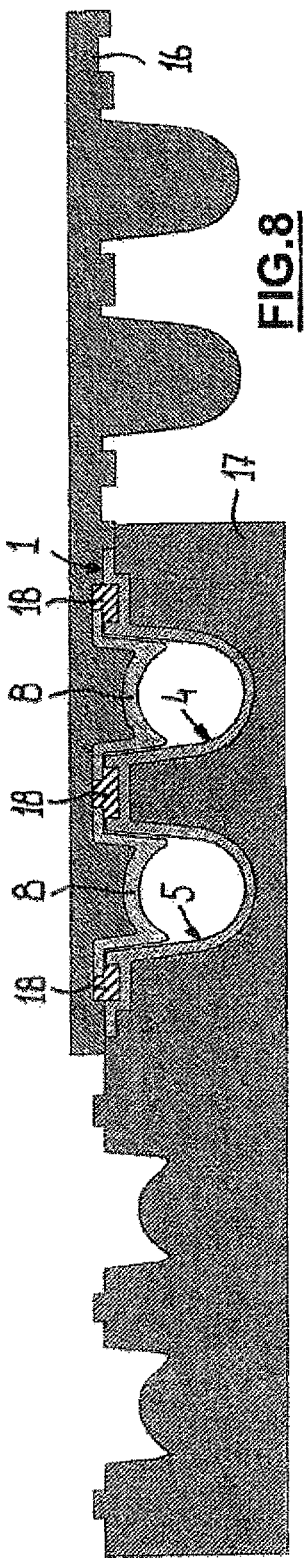

FRAME FOR OPEN ROOF CONSTRUCTION

BACKGROUND

The discussion below is merely provided for general background information and is not intended to be used as an aid in determining the scope of the claimed subject matter.

Aspects of the invention first relate to a frame for an open roof construction, said frame comprising at least one channel member for guiding a drive member, such as a drive cable, wherein said channel member, as seen in cross section, comprises a base part which is defined by a corresponding local depression of the frame and a cover part connected to said base part.

A known frame of the above type comprises a cover part which by means of connection devices, such as screws, rivets or bolts, is connected to the base part at discrete locations. Because of the large amount of connection devices which often are required when the channel member extends along a substantial distance, the manufacture of such a frame is time consuming and complicated. Moreover, such a known frame is not optimally fit for use in an open roof construction in which the drive member has to transmit large forces (for example between a drive motor and a movable panel for opening and closing a roof opening) and may deform the channel member.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In one aspect of the present invention the frame includes a connection between said base part and said cover part which is continuous over the length of said channel member.

The base parts can each have a path with one or more curves. The cover parts are each configured with a curvature that substantially corresponds to each respective base part. In one embodiment, the base part and corresponding cover part form continuous channel members with portions that are parallel to guides for guiding the moveable panel between closed and open positions and portions transverse to the guides. In one embodiment, the frame comprises a transverse element joined and extending between the guides.

The continuous connection between the base part and cover part yields a channel member of which the dimensions and shape are very stable, also when the drive member transmits large forces. The connection between both parts basically extends uninterrupted along the channel member, making it very stable with respect to its shape.

In an embodiment of the frame the cover part is connected to the base part through die slide injection molding. Using such a die slide injection molding allows the manufacture of the frame to be carried out with minimal steps and without the need for additional equipment/tooling. The die slide injection molding results in a channel member of which the base part and cover part are interconnected integrally and continuously in an optimal manner.

In an embodiment of the frame the base part has a substantially U-shaped cross section with two legs defining a space there between, wherein the cover part has dimensions allowing it to be received at least in part in said space between the legs of the base part. As a result the base part contributes effectively to defining the correct position of the cover part and to obtaining the desired final shape of the channel member (and frame).

It is possible that the cover part is provided with members wider than said space; for example, in one embodiment, said cover part has a substantially U-shaped cross section with two legs positioned within said space while engaging the legs of the base part, wherein each cover part leg at its end is provided with an outwardly angled leg part for engaging the outer ends of the corresponding base part legs. The cooperation between the angled leg parts of the cover part and the base part legs is very effective in assuring a correct position of both parts relative to each other.

When the channel member defines a substantially circular inner channel, it may be adopted to a drive cable in an optimal manner. The base part and cover part both define part of such a circular inner channel.

In another embodiment of the frame the channel member defines an inner channel which, in cross section, is completely closed along at least the major part of the length of the channel member. As a result the drive member will be guided in an optimal manner along said major part of the length of the channel member. It is conceivable that a short length of the channel member is not completely closed but, for example, is provided with windows allowing members for activating the drive members (such as gears) to be placed into contact with the drive members.

In an embodiment, the frame comprises two channel members positioned alongside each other.

Preferably the frame will be manufactured from plastic material.

In a second aspect the invention relates to an open roof construction for a vehicle, comprising a roof opening defined in a stationary roof part of the vehicle, a movable panel for opening and closing said roof opening and a frame having one or more features described above surrounding the roof opening and intended for cooperation with said panel.

In a third aspect the invention relates to a method for manufacturing a frame for an open roof construction of the type comprising at least one channel member for guiding a drive member, such as a drive cable, said method comprising a die slide injection molding process with a first step of simultaneously injection molding a frame part defining therein a channel member base part and a channel member cover part at separate locations, a second step of positioning said frame part and channel member cover part in a position which substantially corresponds with the desired final position for defining the channel member and a third step of injection molding additional material for integrally connecting the frame part and channel member cover part.

BRIEF DESCRIPTION OF THE DRAWINGS

Hereinafter aspects of the invention will be elucidated while referring to the drawings, in which:

FIGS. 6-8 show successive stages during the manufacture of a frame.

DETAILED DESCRIPTION OF THE ILLUSTRATIVE EMBODIMENTS

Figure 1:
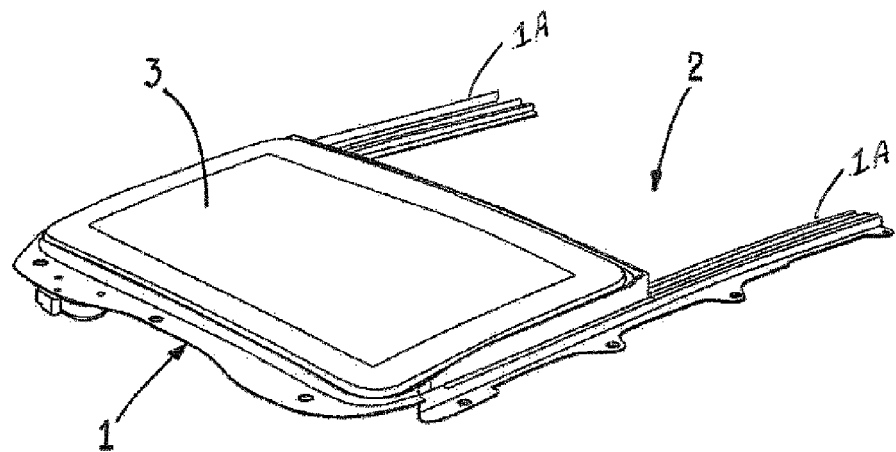
FIG. 1 shows a perspective view of part of an open roof construction.
Figure 2:
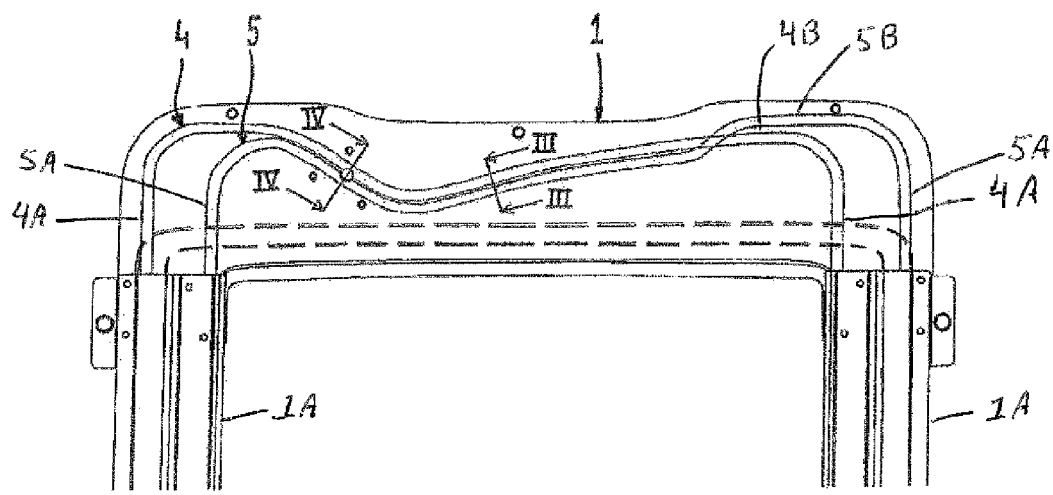
FIG. 2 shows a top plan view of the open roof construction of FIG. 1 without panel.

Firstly referring to FIGS. 1 and 2, a frame 1 for an open roof construction is illustrated. Said frame 1, which in a manner known per se surrounds a roof opening 2 which may be closed or opened by moving a panel 3 along guides 1A, comprises two channel members 4,5 for guiding drive members, such as drive cables 6 (illustrated in FIG. 3b), through which a driving force may be transmitted to the movable panel 3 (and/or other parts of the open roof construction, as is known per se) for achieving a movement thereof. The driving force may be generated manually or by an electric motor.

Each channel member 4,5, as seen in cross section (FIGS. 3a and 3b), comprises a base part 7 which is defined by a corresponding local depression of the frame 1 and a cover part 8 connected to said base part 7 in a manner to be described later. The respective depression of the frame 1 may be achieved in any of known methods, such as for example by using a die.

In the illustrated embodiment, both base parts 7 are integrally connected with each other and with the remainder of the frame 1 to form a single unitary part. However, it is conceivable too that the base parts 7 are connected to the frame 1 in any other manner, such as for example by screws, bolts, rivets, adhesive, soldering or welding. The base parts 7, further, do not need to form a single part but also may define separate parts connected by any known method.

In the illustrated embodiment two separate cover parts 8 are shown. These cover parts 8, however, also may be combined into a single part, including an integral part formed as a single unitary body. The base parts 7 typically each have a path with curves. The cover parts 8 are each configured with a curvature that substantially corresponds to each respective base part 7. The connection between said base parts 7 and said cover parts 8 is continuous over the length of said channel members 4,5 that typically includes one or more curves and is obtained through die slide injection molding in a manner which will be elucidated below while referring to FIGS. 6-8. As illustrated in FIG. 2, the base part 7 and corresponding cover part 8 form continuous channel members 4,5 with portions that are parallel 4A, 5A to guides 1A and portions (e.g. 4B, 5B) transverse to guides 1A. In the embodiment illustrated, frame 1 comprises a transverse element joined and extending between guides 1A.

The base parts 7 have a substantially U-shaped cross section with two legs 9 defining a concave space 10 there between. The cover parts 8 have dimensions allowing them to be received at least in part within said spaces 10 between the legs 9 of the respective base parts 7.

Each cover part 8 has a substantially U-shaped cross section with two legs 11 positioned within said space 10 while engaging the legs 9 of the respective base part 7. Further, each cover part leg 11 at its end is provided with an outwardly angled leg or flange part 12 for engaging outer ends 13 of the corresponding base part legs 9. This structure provides a good fit between the cover parts 8 and the base parts 7.

Figure 3A:
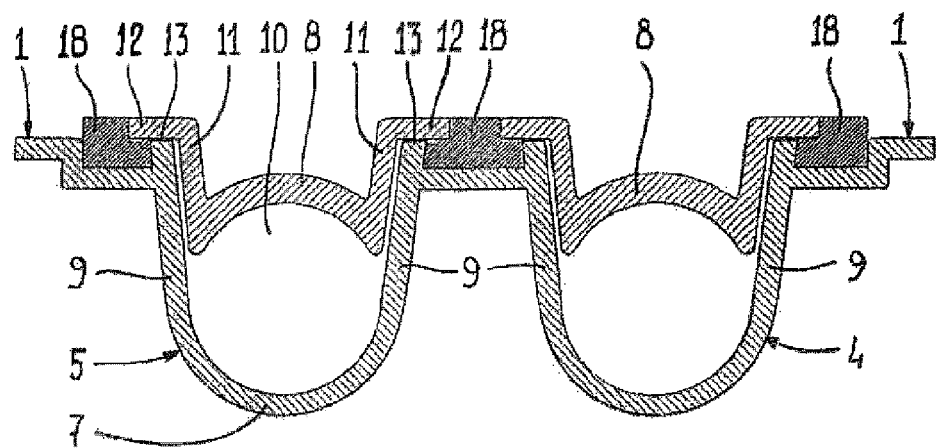
FIG. 3a shows a cross section according to in FIG. 2, with drive cables removed.
Figure 3B:
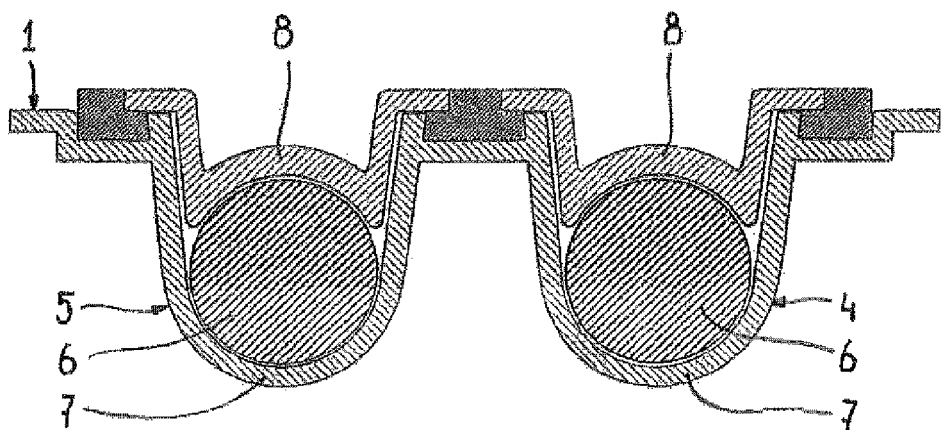
FIG. 3b shows a cross section according to in FIG. 2, with drive cables applied.
Figure 4:
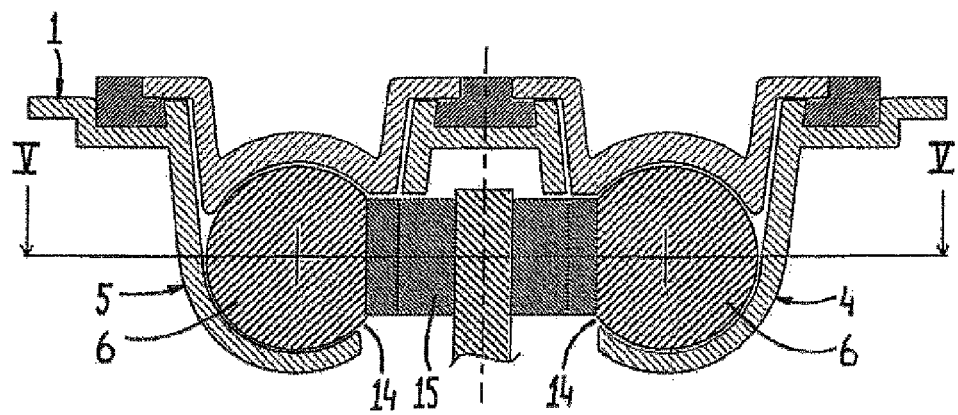
FIG. 4 shows a cross section according to IV-IV in FIG. 2, with drive cables and gear applied.
Figure 5:
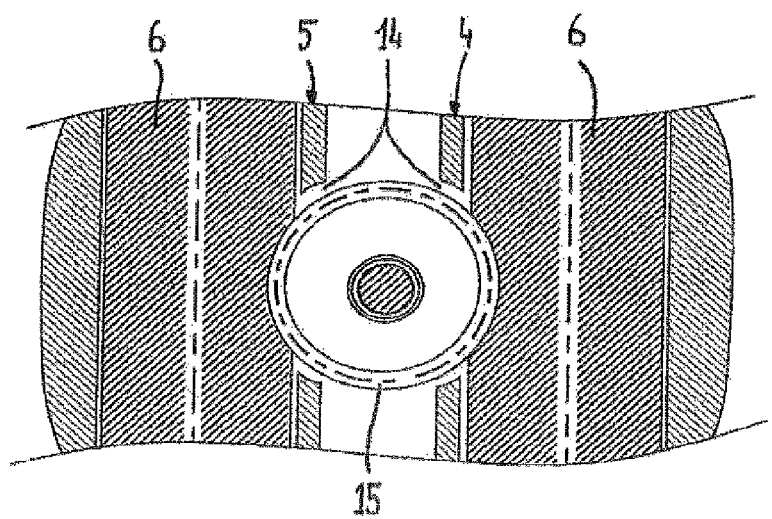
FIG. 5 shows a cross section according to V-V in FIG. 4.

As shown clearly in FIG. 3a the channel members 4,5 define a substantially circular inner space or channel 10 (formed herein by two opposed concave surfaces facing each other and provided by the base part 7 and corresponding cover part 8) within which the drive cables 6 will be housed and which, in cross section, is completely closed along at least the major part of the length of the channel members 4,5. It is conceivable however that a short length of the channel members 5 is not completely closed but (as illustrated in FIGS. 4 and 5) is provided with windows 14 allowing members for activating the drive members (such as gears 15) to be placed into contact with the drive members or drive cables 6.

A method for manufacturing a frame 1 will be elucidated now while referring to FIGS. 6-8. The method comprises a die slide injection molding process with, in an embodiment thereof, the following steps.

During a first step a frame part 1 defining therein two channel member base parts 7, and two channel member cover parts 8 are simultaneously produced by injection molding material at separate (or distinct) locations within a mold having two mold parts 16 and 17 (FIG. 6). The channels through which the molding material flows into the mold are not represented, but are known per se from the state of the art.

During a second step (FIG. 7) mold part 16 together with the cover parts 8 is moved to such a position with respect to mold part 17 that said base parts 7 and cover parts 8 are located in a relative position which substantially corresponds with the desired final position for defining the channel members 4 and 5.

Finally, during a third step (FIG. 8) additional material 18 is injection molded in cavities 19 defined in the mold for integrally connecting the base parts 7 and cover parts 8. Material 18 is a flowable material that solidifies after contact with the base part 7 and the cover part 8 to join the base part 7 to the cover part 8. Material 18 may be the same material from which base parts 7 and cover parts 8 initially are made during the first step, but also may be a different material. Base parts 7 and cover parts 8 likewise may be manufactured from the same or different materials.

When, in an alternative embodiment, the cover parts 8 define a single, integral, unitary body part which is manufactured during the first step, it is not necessary to supply material 18 to the central location indicated in FIG. 8, although such a supply may improve the final connection between the base parts 7 and cover parts 8.

It is noted that the described slide injection molding process may be varied as is known per se from the state of the art.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims. For example, the frame may have different shapes and may be provided with a different number of channel members. The channel members each may comprise a number of channel member lengths which are separated from each other in the longitudinal direction of the channel members, but which themselves are characterized as set forth in the above and thus basically each define a channel member within the meaning of the present invention.

What is claimed is:

1. A frame for an open roof construction, said frame comprising at least one channel member configured to guide a drive member, wherein said channel member, as seen in cross section, comprises a base part which is defined by a corresponding local depression of the frame and a cover part, being a separate part from the base part, that is connected to said base part, wherein a connection between said base part and said cover part comprises a material that has solidified to the base part and a cover part surface of the cover part to fixedly connect the cover part to join the base part having the local depression and the cover part together continuously over at least a portion of a length of said channel member, the cover part surface being a side facing surface with respect to a plan view of the cover part when major surfaces of the cover part are viewed.

2. The frame according to claim 1, wherein the channel member includes a curve, as seen from a plan view of the cover part when major surfaces of the cover part are viewed, and wherein the material that has solidified joins the cover part to the base part continuously through the curve.

3. The frame according to claim 1, wherein the base part has a substantially U-shaped cross section with two legs defining a space there between and wherein the cover part has dimensions allowing it to be received at least in part in said space between the legs of the base part, and the material that has solidified contacting and joining the cover part to the base part remote from the space between the legs of the base part.

4. The frame according to claim 3, wherein the cover part is provided with members wider than said space, and the material that has solidified comprises a flowable material that has solidified contacting said members of the cover part, each of said members having an associated cover part surface.

5. The frame according to claim 4, wherein said cover part has a substantially U-shaped cross section with two legs positioned within said space while engaging the legs of the base part and wherein each member of the cover part leg is an outwardly angled leg part configured to engage outer ends of the corresponding base part legs, the outer ends being remote from a concave section of the local depression formed between the base part legs, and wherein the flowable material that has solidified contacts and joins at least one outwardly angled leg part to a corresponding outer end that said outwardly angled leg part engages.

6. The frame according to claim 1, wherein the channel member defines a substantially circular inner channel.

7. The frame according to claim 1, wherein the channel member defines an inner channel which, in cross section, is completely closed, wherein the material that has solidified contacts and joins the cover part to the base part along at least a major part of the length of the channel member.

8. The frame according to claim 1, comprising two channel members positioned alongside each other, wherein the material that has solidified contacts and joins the cover part to the base part along outermost edges of the two channel members positioned alongside each other.

9. The frame according to claim 1, wherein the base part and cover part comprise plastic material.

10. An open roof construction for a vehicle, comprising a roof opening defined in a stationary roof part of the vehicle, a movable panel for opening and closing said roof opening and a frame comprising at least one channel member configured to guide a drive member, wherein said channel member, as seen in cross section, comprises a base part which is defined by a corresponding local concave depression of the frame and a cover part, being a separate part from the base part, that is connected to said base part, wherein a connection between said base part and said cover part is continuous over a length of said local depression in the base part on a cover part surface of the cover part and comprises a material that has solidified, the cover part surface being a side facing surface with respect to a plan view of the cover part when major surfaces of the cover part are viewed.

11. The open roof construction according to claim 10, wherein the cover part is wider than the local depression and the material that has solidified is solidified to the cover part surface on a portion of the cover part extending beyond the local depression as seen in cross section.

12. The open roof construction according to claim 10 wherein a path of the channel member formed in the base part includes a curve comprising at least a portion of said length of said channel member.

13. The open roof construction according to claim 10, wherein the base part has a substantially U-shaped cross section with two legs defining a space there between and wherein the cover part has dimensions allowing it to be received at least in part in said space between the legs of the base part, and the material that has solidified joins the cover part to the base part remote from the space between the legs of the base part.

14. The open roof construction according to claim 13, wherein the cover part is provided with members wider than said space and the material that has solidified comprises a flowable material that has solidified to at least one of said members wider than said space.

15. The open roof construction according to claim 13, wherein said cover part has a substantially U-shaped cross section with two legs positioned within said space while engaging the legs of the base part and wherein each cover part leg is provided with an outwardly angled leg part configured to engage outer ends of the corresponding base part legs, the outer ends being remote from a concave section of the local depression formed between the base part legs, and wherein the flowable material that has solidified contacts and joins at least one outwardly angled leg part to a corresponding outer end that said outwardly angled leg part engages.

16. The open roof construction according to claim 10, wherein the cover part includes a concave surface facing a concave surface in the base part.

17. The open roof construction according to claim 10, wherein the base part and the cover part secured thereto define an inner channel which, in cross section, is completely closed, wherein the material that has solidified contacts and joins the cover part to the base part along at least a major part of the length of the channel member.

18. The open roof construction according to claim 10, comprising two channel members positioned alongside each other, wherein the material that has solidified contacts and joins the cover part to the base part along an outermost edge of the two channel members positioned alongside each other.

19. The open roof construction according to claim 10, wherein the base part and cover part comprise plastic material.

20. A method for manufacturing a frame for an open roof construction of the type comprising at least one channel member for guiding a drive member, said method comprising:
   providing a base part comprising a depression extending in a path in the base part, and a cover part being a separate part from the base part;
   positioning said base part and cover part in a position where the cover part covers the local depression; and
   joining the cover part to the base part to define an enclosed inner space along the path of the depression, wherein joining comprises using a material that is joined to the base part and a cover part surface of the cover part to fixedly connect the cover part to the base part over a longitudinal extent of the cover plate surface, the cover part surface being a side facing surface with respect to a plan view of the cover part when major surfaces of the cover part are viewed.

21. The method of claim 20 wherein the material is separate from the cover part and separate from the base part.

22. The method of claim 20 wherein joining comprises joining the cover part to the base part along an edge of at least one of the cover part and the base part.

23. The method of claim 20 wherein providing comprises simultaneously injection molding the base part with the cover part at separate locations in a mold, and wherein joining comprises injecting flowable material into the mold to contact portions of the base part and the cover part surface, the flowable material joining the base part to the cover part when the flowable material solidifies.

24. A frame for an open roof construction, said frame comprising at least one channel member configured to guide a drive member, wherein said channel member, as seen in cross section, comprises a base part which is defined by a corresponding local depression of the frame and a cover part, being a separate part from the base part, that is connected to said base part, and wherein a material contacts the base part and a cover part surface of the cover part to fixedly connect the cover part to the base part, the cover part surface being a side facing surface with respect to a plan view of the cover part when major surfaces of the cover part are viewed.

25. The frame according to claim 24, wherein the material contacts the cover part surface over a longitudinal length thereof to a surface of the base part over a longitudinal length thereof continuously over at least a portion of a length of said channel member.

26. The frame according to claim 25, wherein the channel member includes a curve, as seen from a plan view of the cover part when major surfaces of the cover part are viewed, and wherein the material joins the cover part to the base part continuously through the curve.

27. The frame according to claim 25 wherein material contacts a side facing surface of the base part.

28. The frame according to claim 25 wherein the base part comprises a base flange extending laterally away from the channel member beyond the cover part surface, and wherein the material contacts a surface of the base flange.

29. The frame according to claim 28 wherein the base flange comprises an elongated recess formed by the surface of the base flange that the material contacts.

* * * * *